Patented May 17, 1938

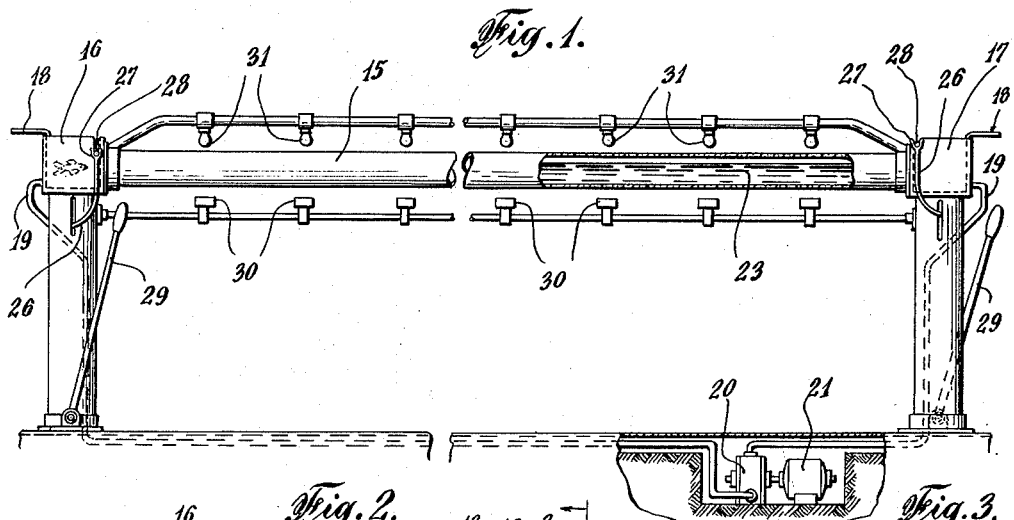
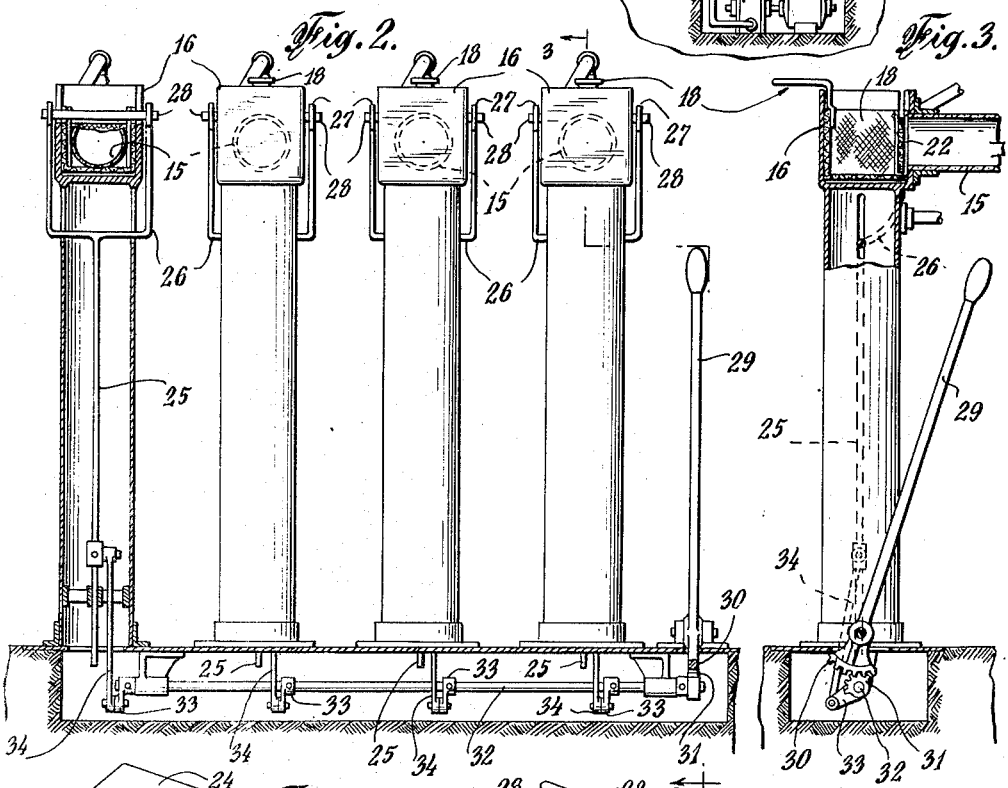
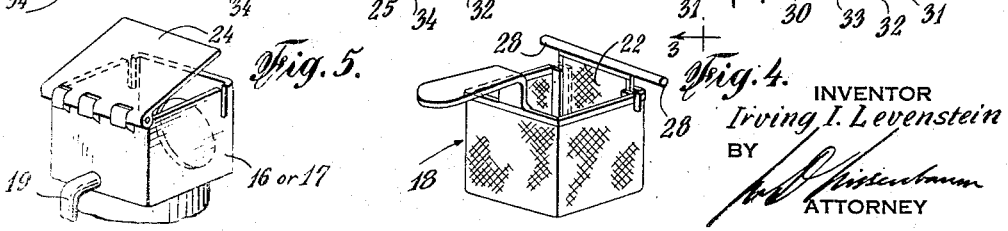

2,117,616

UNITED STATES PATENT OFFICE 2,117,616

FISH RACE APPARATUS

Irving I. Levenstein, Brooklyn, N. Y.

Application June 9, 1937, Serial No. 147,232

6 Claims. (Cl. 273—86)

My present invention relates to fish racing apparatus and more particularly to the type for conducting live fish races.

The principal object of this invention is to provide a novel and improved device for live fish racing wherein the fish contestants are subjected to identical conditions.

Another object hereof is to provide a novel and improved apparatus of the character described wherein the fish contestants are all subject to natural stream conditions.

A further object hereof is to provide a novel and improved apparatus of the type set forth wherein the fish contestants will naturally swim towards the goal.

Another object of this invention is to provide a novel and improved apparatus of the character mentioned wherein the release of the fish contestants is effected either individually or simultaneously, and whereby their movement may be controlled after one of them has reached the goal.

Other objects will become manifest as this disclosure proceeds.

In the accompanying drawing, forming part of this application, similar characters of reference indicate corresponding parts in all the views.

Fig. 1 is an elevation, partly in section of a device embodying my present invention.

Fig. 2 is a side view thereof.

Fig. 3 is a section taken at line 3—3 in Fig. 2.

Fig. 4 is a perspective view of a fish receptacle used at the start and goal in the practice of this invention.

Fig. 5 shows in perspective, a slightly modified form of an end for a raceway.

In the drawing, the numeral 15 indicates elongated substantially horizontal glass tubes or other structures to serve as troughs for water raceways. Ends 16 and 17, of each of these raceways, open at the top to receive the wire mesh receptacles 18, are connected by piping 19, in which is interposed the pump 20, driven by a motor 21. The receptacles 18 are each provided with a vertically slidable gate 22, which when lifted, would permit free passage of a fish from the receptacle 18 into the raceway 15, or vice versa.

It is known that fish habitually swim upstream, meaning against the current, for by so doing, greater quantities of water will pass through the gills, whose function is to extract the oxygen from the air dissolved in the water, and for the further reason that the current carries along solid material and small forms of water life which serve as food for the fish to receive in its travel. In fact, it is the usual habit of fish to swim downstream, meaning with the current, only in chasing its prey, during migration, and in attempts to avoid capture.

Each of the entries, as for instance gold fish or other small species, are placed in individual receptacles 18, at ends 16, of the raceways 15, or if each of the contestants can be identified by their natural markings or because of difference in kind, then all may be placed in one receptacle 18, in which instance, only one raceway 15 is used for all the specimen, instead of an individual raceway for each specimen. Of course, to avoid disturbing influences among the fish, it is advantageous to have one fish to a raceway 15.

The pump 20 is operated to agitate the water 23, whereby a current is produced in the raceways 15, to emulate the movement of natural streams, in a direction flowing towards the starting points, namely, the ends 16. Now the owners of each of the fish, upon a given signal, lifts the gate 22 of the receptacle 18 holding his entry, whereupon the fish are free to enter the respective raceways 15. Relying upon the aforementioned habits of fish, they will swim, or at least the current against them will tend to make them swim, towards the opposite ends 17 of the raceway, and that fish which first passes into the receptacle 18, at the other end 17, would be the winner.

The fish at the end of the race may be allowed to enter the receptacles 18 at the goals 17, or else, after the race is over, the pump 20 could be speeded up to such an extent that the current will force all the fish back to the receptacle 18, which are at the starting points, meaning at ends 16, in which event ends 17 may be covered by lids 24, or else the direction of rotation of the pump 20 can be reversed and speeded up so that all losers will be forced into the receptacles at their respective goals, meaning ends 17.

It is preferable in some embodiments to include mechanism whereby all the gates 22 will be lifted simultaneously. For such purpose, at the ends 16 and 17 of each raceway 15, I provide for each unit, a vertically slidably mounted rod 25, terminating in a yoke 26, the arms of which embrace the said raceway ends, and the upward extremities of each of which arms terminate in a yoke 27, which receive the outwardly extending pins 28 of the gates 22. Upon upward movement of the rod 25, the gates 22 will be lifted, and upon downward movement of such rods 25, the gates 22 will fall due to their weight. Lever 29, when moved, will cause segmental gear 30 to turn its coacting segmental gear 31 on stud shaft 32 which carries the crank 33 linked by member 34 to the rod 25. Movement of lever 29 in one direction, will cause all the gates 22 to lift up simultaneously, and upon reverse movement of said lever 29, all the gates 22 will fall due to gravity. It is to be noted, that the receptacles 18 can each be lifted from the raceway ends 16 and 17, and out of the yokes 27, and easily replaced therein again, with pins 28 resting in the yokes 27. In the practice of this invention, it is evident that any other suitable means may be employed to control gate movement and to produce flowing water, and to regulate speed and direction of water flow, depending upon the manner in which the teachings of this invention is employed and the rules and technique agreed upon by the entrants on how the race should be run.

To urge the fish toward the goals 17, it is evident that bait may be moved in the raceways 15, towards the goals at a speed faster than the fish swim.

To indicate the progress of the race, photo-electric cells 30 may be employed with co-operative light sources 31, in suitable circuits, including a bank of lamps on an indicator board. Such circuits and indicator board are not shown, for they are well known in the electrical art, and no claim for such is made herein.

This invention is capable of numerous forms and various applications without departing from the essential features herein disclosed. It is therefore intended and desired that the embodiment shown herein be deemed illustrative and not restrictive, and that the patent shall cover whatever features of patentable novelty exist in the invention disclosed; reference being had to the appended claims rather than to the specific description herein to indicate the scope of the invention.

I claim:—

1. In an apparatus of the character described, a raceway for holding water, a receptacle for holding live fish, positioned at one end of the raceway, means to make the raceway and receptacle communicative whereby the fish shall have access to the raceway, and means to effect a flow in the water in the raceway in a direction towards the receptacle whereby the fish are subjected to upstream conditions upon entering the raceway.

2. In an apparatus of the character described, a raceway for holding water, a receptacle for holding live fish, positioned at one end of the raceway; a wall portion of said receptacle being moveable, means to shift said moveable wall portion whereby the receptacle and the raceway are made communicative, so that the fish shall have access to all of the raceway, and means to effect a flow in the water in the raceway in a direction towards the receptacle whereby the fish are subjected to upstream conditions upon entering the raceway.

3. In an apparatus of the character described, a raceway for holding water, a partition moveably mounted therein spaced from one end thereof to form a receptacle at said end for live fish, whereby upon movement of said partition, the fish shall have access to all of the raceway, and a member moveably mounted at the other end of the raceway, adapted when moved to partition the raceway to form a receptacle at said other end for receiving and holding the fish after it has swum the length of the raceway.

4. In an apparatus of the character described, substantially parallel raceways for holding water, partitions moveably mounted one in each raceway spaced from one end of each of said raceways respectively to form a receptacle in each raceway for live fish, and members moveably mounted at the other ends of the respective raceways to form a receptacle in each raceway at said ends for receiving and holding the fish after they had swum the length of the respective raceways, means to simultaneously move the first mentioned partitions whereby the fish in each instance shall have access to the respective raceway, and means to move the second mentioned partition members.

5. An apparatus as in claim 3, including means to effect a flow in the water in the raceway in a direction towards the first mentioned partition, whereby the fish are subjected to upstream conditions upon entering the raceway.

6. An apparatus as in claim 4, including means to effect a flow in the water in all the raceways in a direction towards the first mentioned partitions, whereby the fish are subjected to upstream conditions upon entering the raceway.

IRVING I. LEVENSTEIN.